(12) United States Patent
Kudoh

(10) Patent No.: US 8,149,521 B2
(45) Date of Patent: Apr. 3, 2012

(54) LENS APPARATUS AND IMAGING APPARATUS

(75) Inventor: Tomoyuki Kudoh, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 187 days.

(21) Appl. No.: 12/681,368

(22) PCT Filed: Oct. 3, 2008

(86) PCT No.: PCT/JP2008/068407
§ 371 (c)(1),
(2), (4) Date: Apr. 1, 2010

(87) PCT Pub. No.: WO2009/044936
PCT Pub. Date: Apr. 9, 2009

(65) Prior Publication Data
US 2010/0271712 A1    Oct. 28, 2010

(30) Foreign Application Priority Data
Oct. 4, 2007  (JP) .................................. 2007-261089

(51) Int. Cl.
*G02B 15/14* (2006.01)
*G02B 7/02* (2006.01)
(52) U.S. Cl. ........................................ 359/699; 359/813
(58) Field of Classification Search .......... 359/694–704, 359/811–813
See application file for complete search history.

(56) References Cited

U.S. PATENT DOCUMENTS

| 5,765,048 A * | 6/1998 | Nomura et al. | 396/72 |
| 6,606,206 B2 | 8/2003 | Takeshita et al. | 359/704 |
| 7,414,802 B2 * | 8/2008 | Noguchi | 359/819 |
| 2004/0062537 A1 | 4/2004 | Nomura | 396/72 |

FOREIGN PATENT DOCUMENTS

| JP | 2001-324663 A | 11/2001 |
| JP | 2003-90948 A | 3/2003 |
| JP | 3842087 B2 | 3/2003 |
| JP | 2004-258636 A | 9/2004 |
| JP | 2005-315959 A | 11/2005 |

OTHER PUBLICATIONS

U.S. Appl. No. 12/681,364, filed Apr. 1, 2010, Tomoyuki Kudoh.

\* cited by examiner

*Primary Examiner* — Mohammed Hasan
(74) *Attorney, Agent, or Firm* — Carter, DeLuca, Farrell & Schmidt, LLP

(57) ABSTRACT

A lens apparatus includes a first lens unit and a second lens unit that can respectively move in an optical axis direction, a first cam tube, a linearly moving guide tube that is arranged on an inner circumferential side of the first cam tube and configured to guide the second lens unit in the optical axis direction, a guide member that is configured to guide the linearly moving guide tube in the optical axis direction, a cylindrical member that is provided on an outer circumferential side of the first lens unit, and a second cam tube. The first lens unit includes a guide part configured to guide the cylindrical member in the optical axis direction.

3 Claims, 7 Drawing Sheets

LENS APPARATUS AND IMAGING APPARATUS

CROSS REFERENCE TO RELATED APPLICATIONS

This application is a National Stage filing of PCT application No. PCT/JP2008/068407 filed on Oct. 3, 2008, which claims priority from the benefit of Japanese Patent Application No. 2007-261089 filed on Oct. 4, 2007, the disclosures of which are hereby incorporated by reference herein in

TECHNICAL FIELD

The present invention relates to a lens apparatus suitable for an imaging apparatus such as a compact digital camera.

BACKGROUND ART

Imaging apparatuses described above include one that has a zoom lens barrel having a zoom function which changes an imaging magnification by moving plural lens units (including a lens and its holding member) in an optical axis direction (see Japanese Patent Laid-Open No. 2001-324663).

In the zoom lens barrel disclosed in Japanese Patent Laid-Open No. 2001-324663, a plurality of lens units are moved in the optical axis direction by cams formed on a cam tube which can rotate around the optical axis. Here, a plurality of lens units are prevented from rotating so as not to rotate around the optical axis together with the cam tube. In other words, a plurality of lens units are driven in the optical axis direction by rotations of the cam tube while being guided in the optical axis direction.

Imaging apparatuses are desired to have a higher magnification ratio, but on the other hand they are required to be smaller and in particular thinner so that they can be easily carried around. A multistage stretching structure that shortens the size in the optical axis direction of each tubing member in the zoom lens barrel is conceivable for both the high magnification ratio and the low profile. However, the multistage stretching structure makes it difficult to arrange the cams for driving a plurality of lens units without interfering with each other.

Japanese Patent No. 3,842,087 discloses a zoom lens barrel provided with a first and a second cam for moving first and second lens units in the optical axis direction respectively on an outer circumferential surface and an inner circumferential surface of a rotation tube so that the first and second cams are provided without interfering (intersecting) with each other.

In the lens barrel disclosed in Japanese Patent No. 3,842, 087, an outer circumferential tube arranged on an outer circumferential side of the first lens unit that is arranged closest to an object and an inner circumferential tube arranged on an inner circumferential side of the cam tube are guided (or moved linearly) in the optical axis direction by a common fixed tube. In this way, the fixed tube needs a long linearly moving guide groove, and the outer circumferential tube and the inner circumferential tube need to engage with the groove. Therefore, it is difficult to reduce the size of the lens barrel with increased space and layout efficiencies.

Even a lens barrel configured to be a three-stage-stretchable type for a high zoom magnification ratio requires a member that linearly moves and guides both the outer circumferential tube and the inner circumferential tube in the optical axis direction, increasing the size of the lens barrel in order to maintain a space for the member.

DISCLOSURE OF INVENTION

The present invention provides a lens apparatus that can implement multistage-stretchable-type zooming and linearly guide a plurality of members which move in the optical axis direction while having a compact structure, and an imaging apparatus that incorporates the lens apparatus.

A lens apparatus according to one aspect of the present invention includes a first lens unit and a second lens unit that can respectively move in an optical axis direction, a first cam tube that includes a first cam part and a second cam part respectively formed on an outer circumferential surface and an inner circumferential surface thereof and moves the first and second lens units respectively in the optical axis direction using the first and second cam parts when rotating around an optical axis, a linearly moving guide tube that is arranged on an inner circumferential side of the first cam tube and configured to guide the second lens unit in the optical axis direction, a guide member that is configured to guide the linearly moving guide tube in the optical axis direction, a cylindrical member that is provided on an outer circumferential side of the first lens unit, and a second cam tube that is configured to move the first cam tube in the optical axis direction together with the linearly moving guide tube and the cylindrical member while rotating around the optical axis. The first lens unit includes a guide part configured to guide the cylindrical member in the optical axis direction.

Other features and advantages of the present invention will be apparent from the following description given in conjunction with the accompanying drawings, in which like reference characters designate the same or similar parts throughout the figures thereof.

BEST MODE FOR CARRYING OUT THE INVENTION

Referring now to the accompanying drawings, a description will be given of an embodiment of the present invention.

First Embodiment

FIGS. 4 to 8 are external views of a compact digital still camera as an imaging apparatus having a zoom lens barrel (lens apparatus) according to the first embodiment of the present invention.

A camera 12 includes a zoom lens barrel (hereinafter referred to as "a lens barrel") 100 that can change an imaging magnification.

Figure 4:
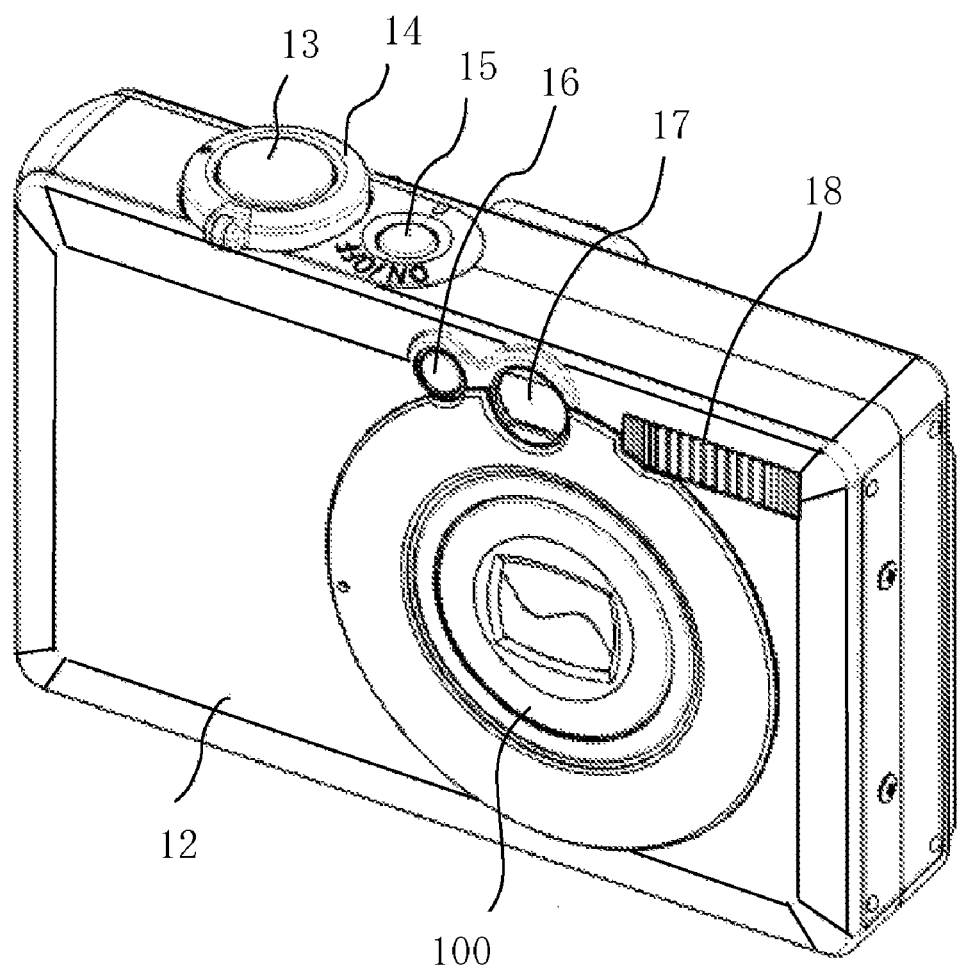
FIG. 4 is a perspective view of a camera (in a power-off state) having the lens barrel according to the embodiment.
Figure 5:
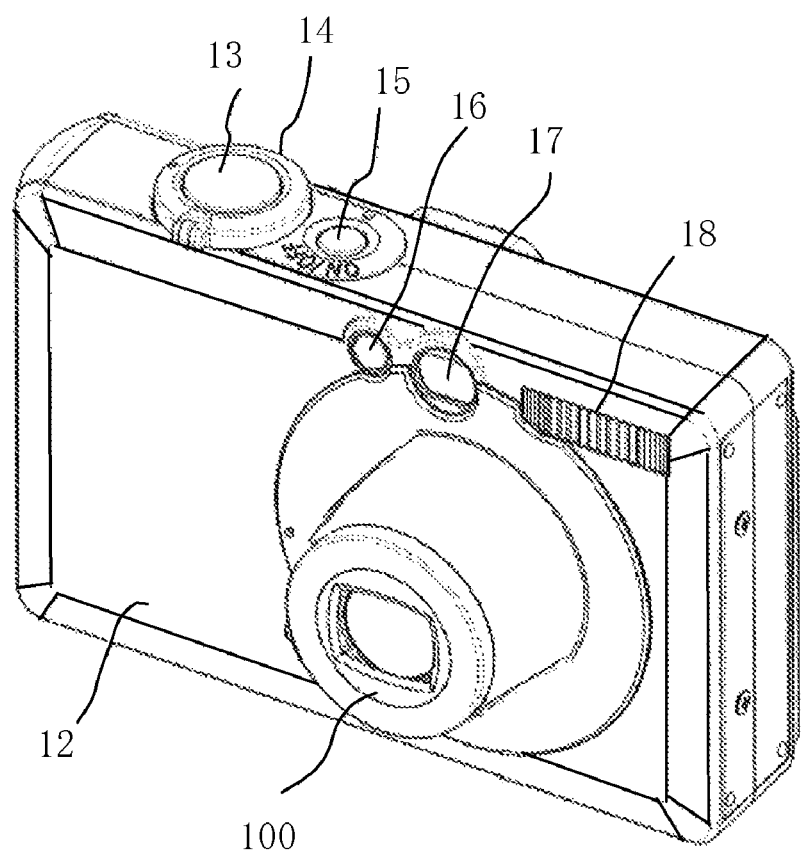
FIG. 5 is a perspective view of the above camera (in a power-on state).
Figure 6:
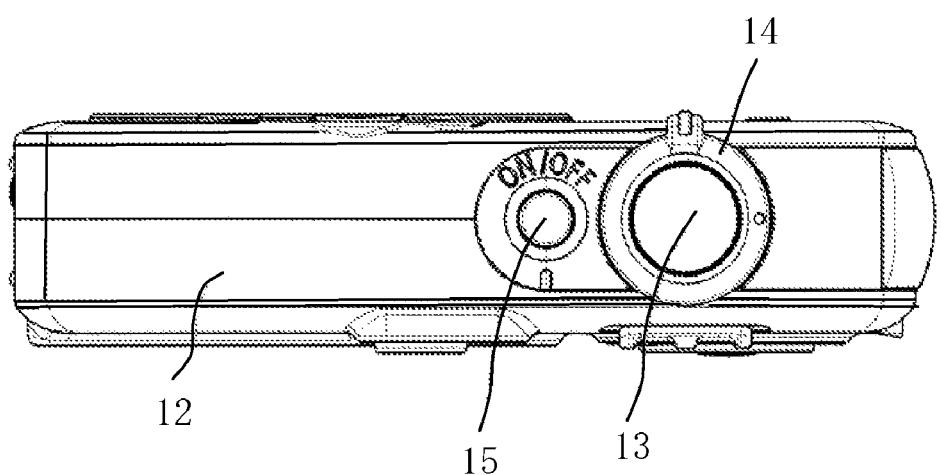
FIG. 6 is a top view of the above camera.
Figure 7:
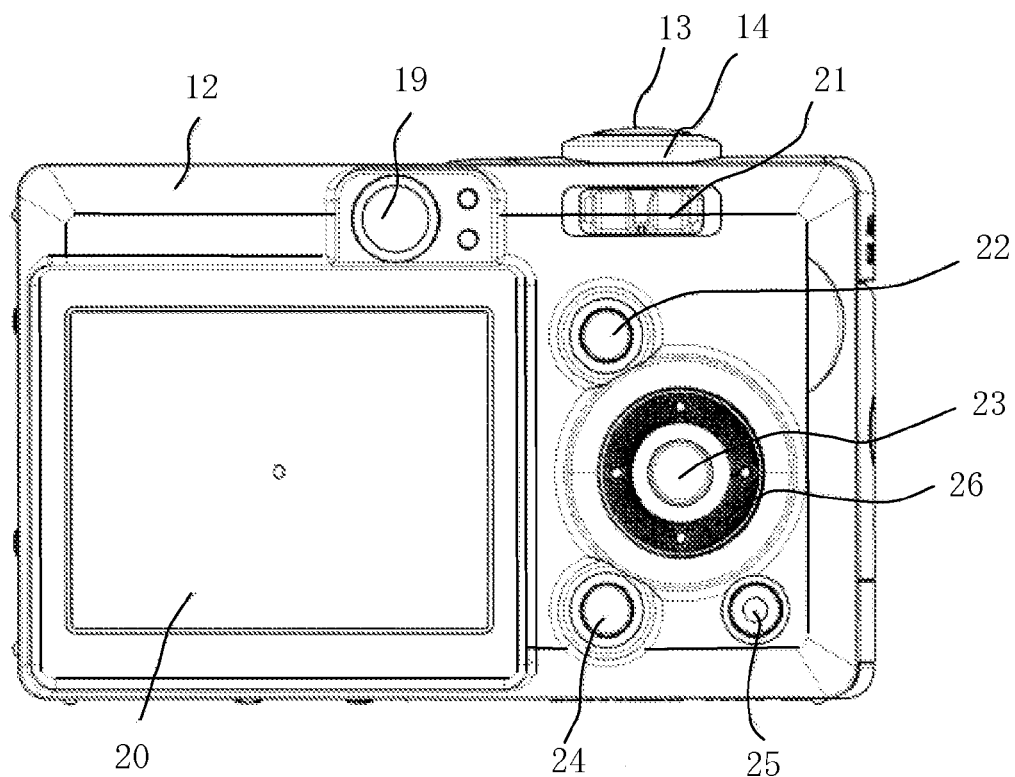
FIG. 7 is a back view of the above camera.
Figure 8:
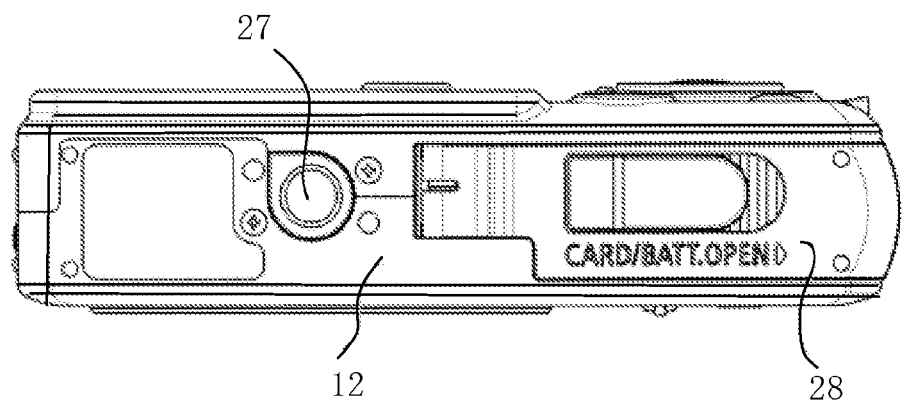
FIG. 8 is a bottom view of the above camera.
Figure 9:
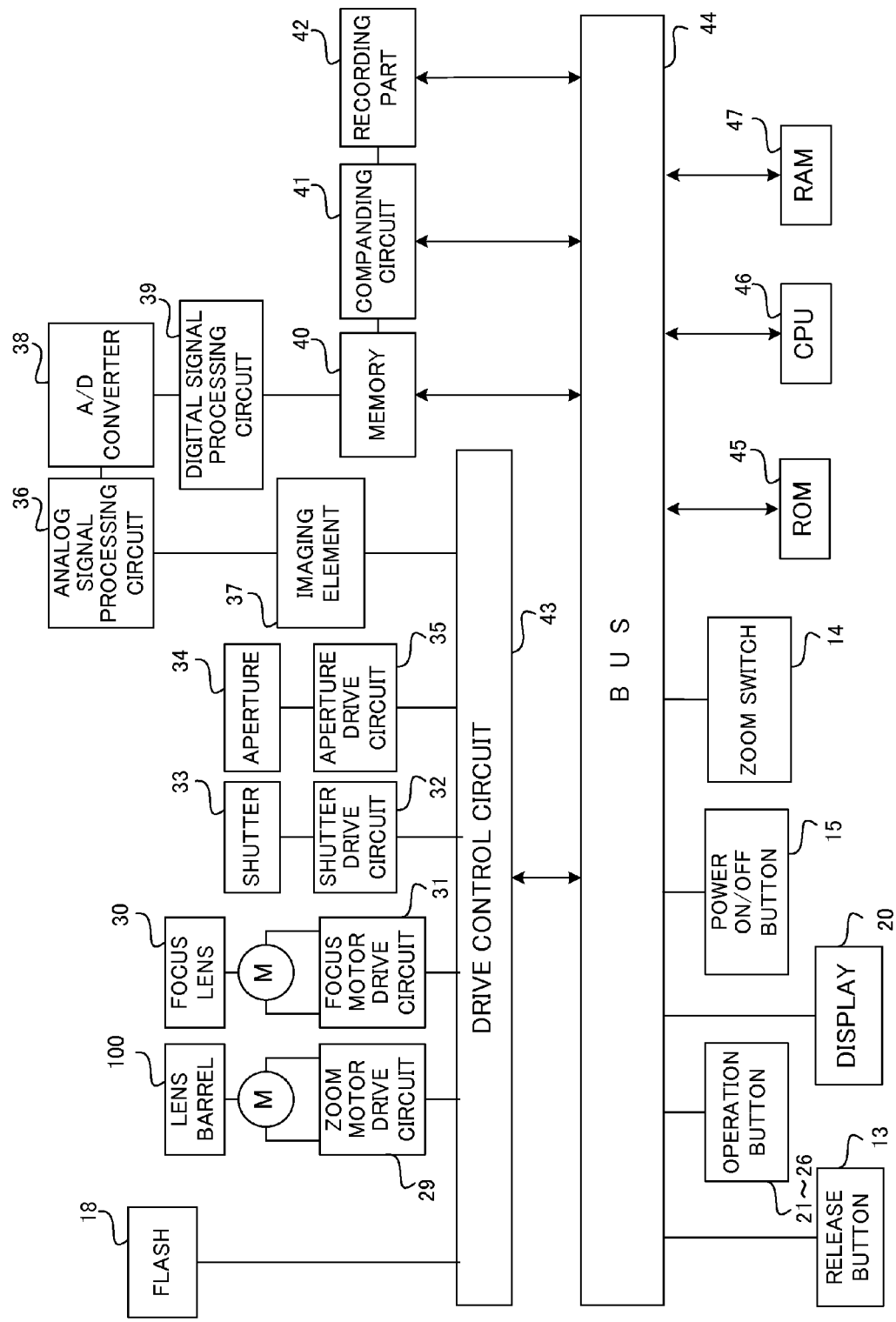
FIG. 9 is a block diagram showing the electrical structure of the above camera.

FIG. 4 shows the camera 12 in a power-off state, in which the lens barrel 100 is stored inside a camera body. FIG. 5 shows the camera 12 in a power-on state, in which the lens barrel 100 projects from the camera body (and is ready to capture an image). Further, FIGS. 6, 7, and 8 respectively show a top view, a back view, and a bottom view of the camera 12. FIG. 9 shows the electrical structure of the camera 12.

As shown in these drawings, on a front side of the camera 12, a view finder 17 that determines a composition of an object, a light emitting part 16 that emits auxiliary light for photometry and focusing, a flash 18 that illuminates the object, and the lens barrel 100 are provided.

On the top side of the camera 12, a release button 13, a power ON/OFF button 15, and a zoom switch 14 are provided. There are provided on the bottom side of the camera 12, a tripod attachment part 27 and slots used to insert a recording medium (card-type semiconductor memory) and a battery to the inside which are not shown. These slots are enclosed by a cover 28.

Further, on the back side of the camera 12, various operation buttons 21, 22, 23, 24, 25, and 26 are arranged so as to enable setting of various camera functions and switching of modes (still-picture imaging mode, motion-picture imaging mode, reproduction mode etc.). 20 is a display such as an LCD, and 19 is an eyepiece part of the view finder.

In FIG. 9, the display 20 displays image data that are generated by imaging and stored in a memory 40 or that are read from the recording medium.

A CPU 46, a ROM 45, and a RAM 47 are connected respectively to each part of the release button 13, a drive control circuit 43, the operation buttons 21 to 26, the display 20, the memory 40, and a recording part 42 via buses 44.

A zoom motor drive circuit 29, a focus motor drive circuit 31, a shutter drive circuit 32, an aperture drive circuit 35, an imaging element 37 including a CCD sensor, or a CMOS sensor, and the flash 18 are connected to the drive control circuit 43. The drive control circuit 43 operates each circuit in response to signals from the CPU 46.

The ROM 45 stores computer programs that allow the CPU 46 to control the various parts and circuits described above. The RAM 47 stores required data in order to control the each part and circuit.

Once the power ON/OFF button 15 is turned on, the CPU 46 reads out a required program from the ROM 45, and starts an initial operation. At this time, the CPU 46 turns the lens barrel 100 from a storage state inside the camera body to the projection state (wide-angle state). When the zoom switch 14 is operated, the CPU 46 drives the lens barrel 100 in telescopic motion through the zoom motor drive circuit 29 to perform zooming by changing a distance between a first lens unit and a second lens unit to be described later.

When the release button 13 is half-pressed, the CPU 46 provides photometry based on a signal from the imaging element 37, and determines, based on the photometric value, an aperture value, shutter speed, and whether or not a light emission of the flash 18 is necessary. The CPU 46 also measures the distance from the object, and drives a focus lens 30 (corresponding to the first and second lens units which will be described later) through the focus motor drive circuit 31 to an in-focus position to achieve an in-focus state.

When the release button 13 is pressed down, the CPU 46 controls opening/closing of the aperture 34 through the aperture drive circuit 35, as well as controlling opening/closing of the shutter 33 through the shutter drive circuit 32 to expose the imaging element 37. An output signal from the imaging element 37 is input to a digital signal processing circuit 39 through an analog signal processing circuit 36 and an A/D converter 38. The digital signal processing circuit 39 performs various processing for the signal input from the imaging element 37, and generates an image signal (image data). The image data is stored in the memory 40.

The image data stored in the memory 40 is compressed by a companding circuit 41 and stored in the recording medium through the recording part 42. The image data is also displayed on the display 20.

Figure 1:
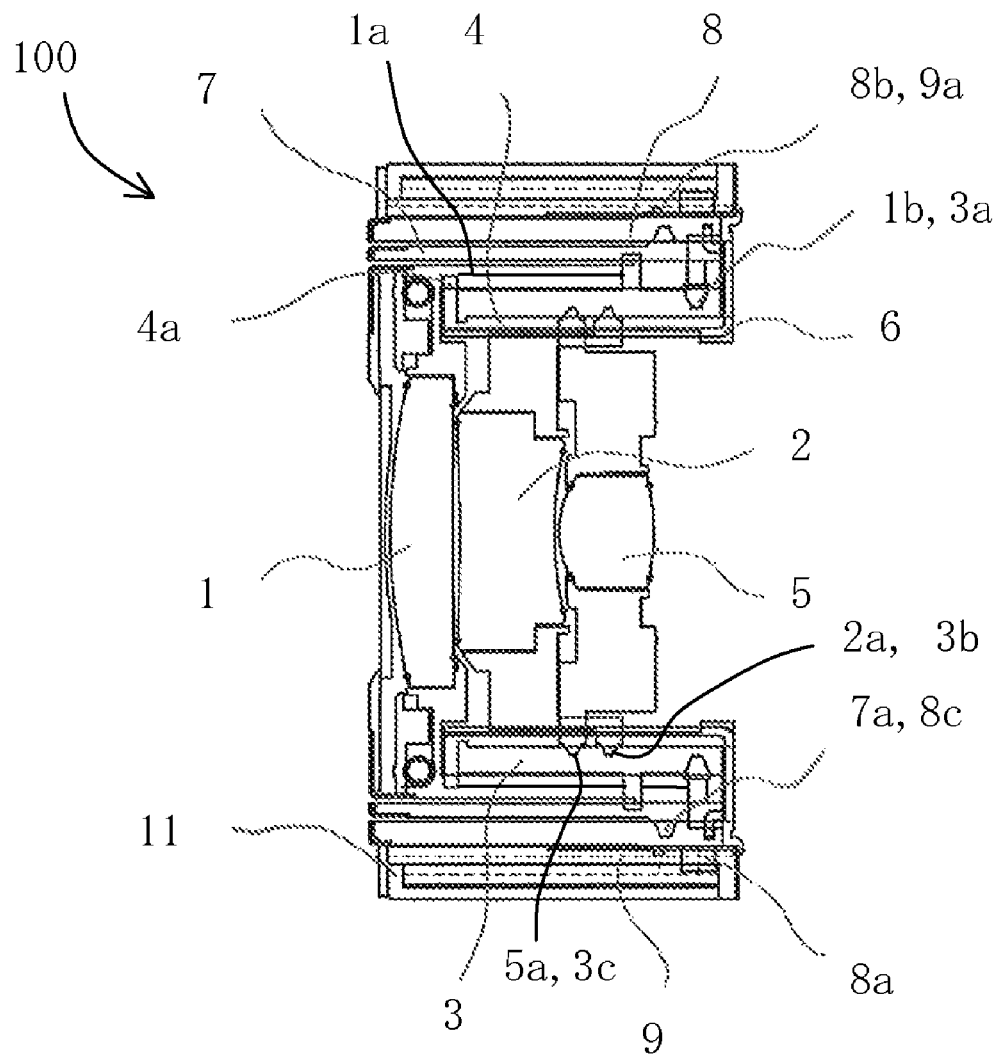
FIG. 1 is a sectional view of a lens barrel (when stored) according to an embodiment of the present invention.
Figure 2:
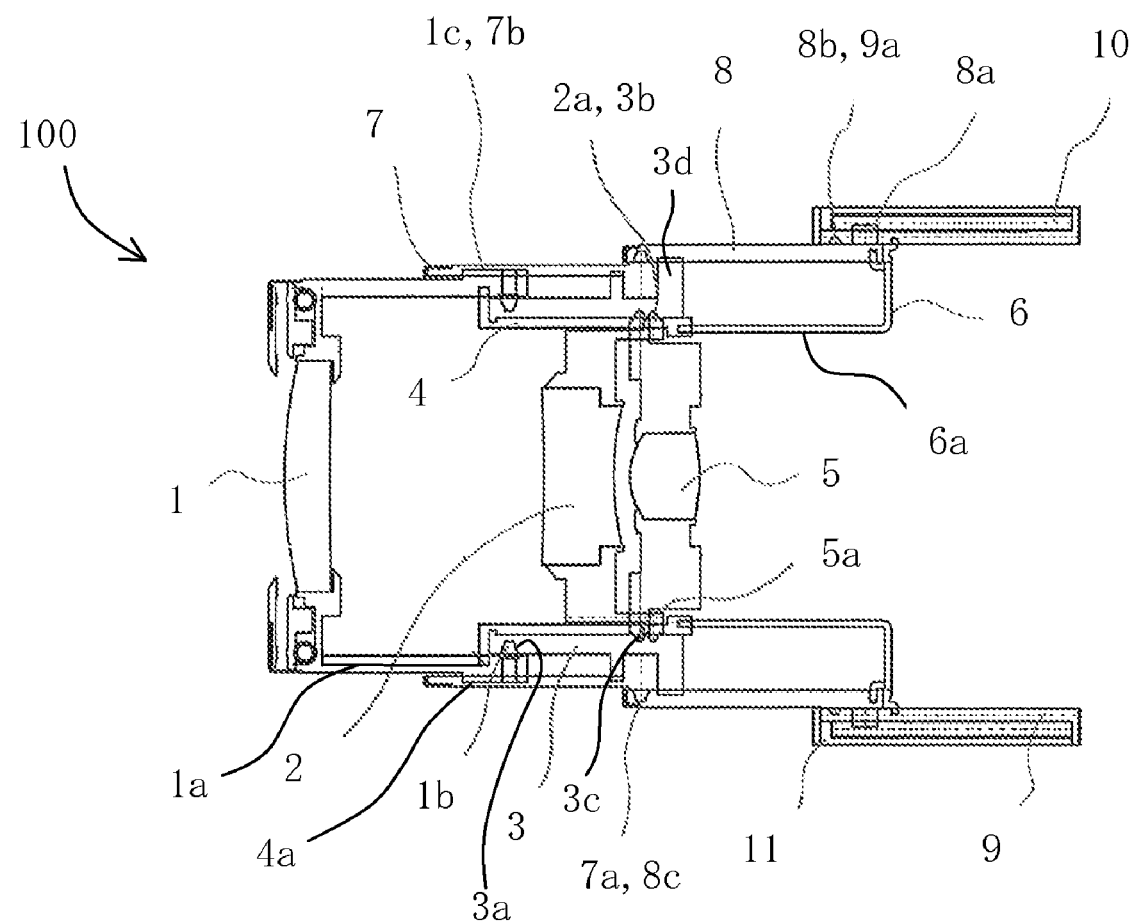
FIG. 2 is a sectional view of the lens barrel (at a wide-angle end) according to the embodiment.
Figure 3:
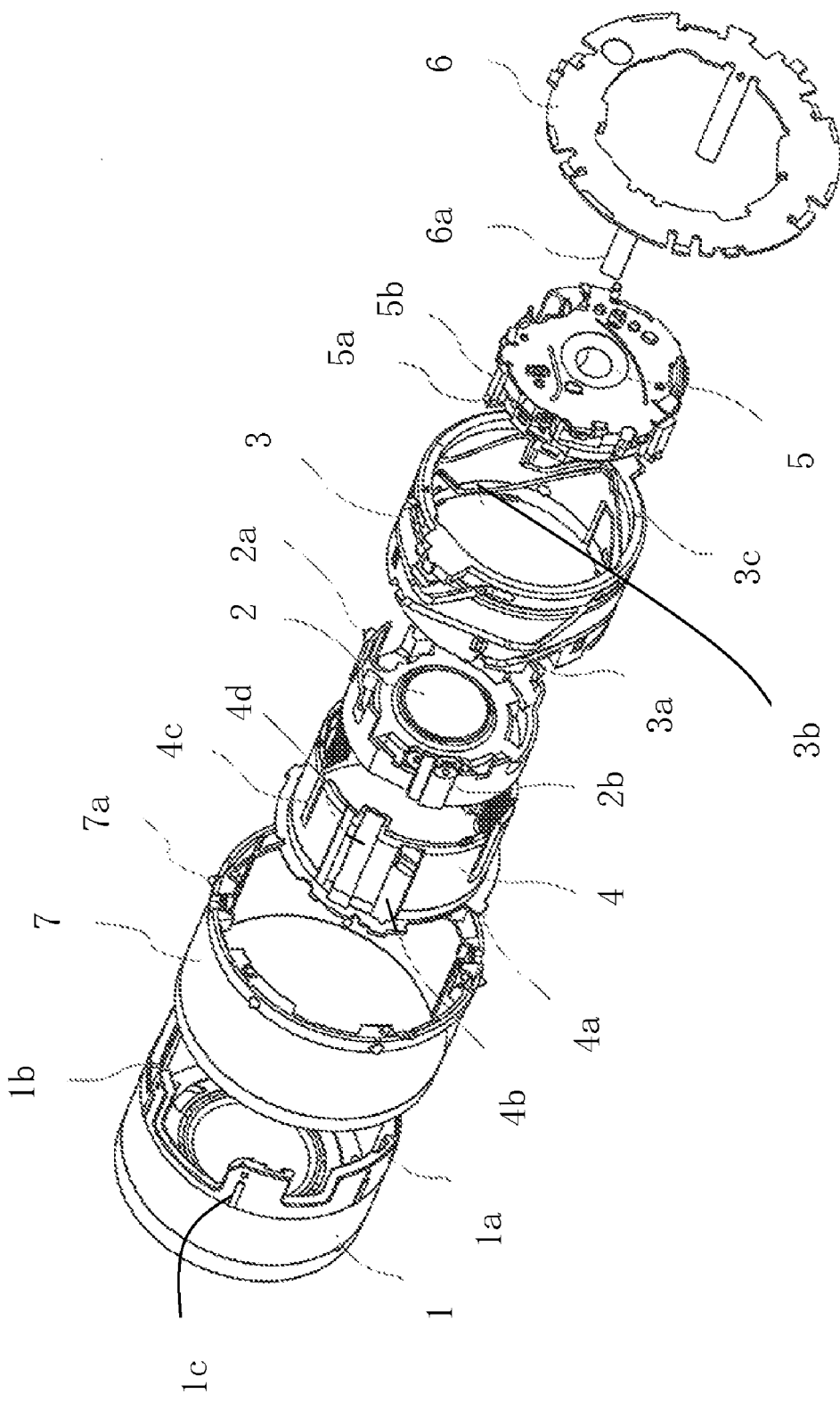
FIG. 3 is an exploded perspective view of the lens barrel according to the embodiment.

Referring now to FIGS. 1 to 3, a description will be given of the structure of the lens barrel 100. FIGS. 1 and 2 are sectional views of the lens barrel 100 respectively showing a stored state and a wide-angle state. FIG. 3 is an exploded perspective view of the lens barrel 100.

In FIGS. 1 to 3, 1 is a first lens unit, which includes a first lens and a tubular member that holds the lens. Three cam followers 1b are formed on an inner circumferential surface at intervals of 120° around the optical axis, at a rear end in the optical axis direction (or an image-side end) of the first lens unit 1.

2 is a second lens unit, which includes a second lens arranged closer to the image side than the first lens and a member that holds the lens. Three cam followers 2a are formed on an outer circumferential surface at intervals of 120° around the optical axis at a rear end in the optical axis direction (or an image-side end) of the second lens unit 2.

5 is a third lens unit, which includes a third lens arrange closer to the image side than the second lens and a member that holds the lens. Three cam followers 5a are formed on an outer circumferential surface of the third lens unit 5 at intervals of 120° around the optical axis.

3 is a cam tube (a first cam tube), which includes three first cam (groove) parts 3a that are engaged with the three cam followers 1b and formed on the outer circumferential surface in a circumferential direction, and three second cam (groove) parts 3b that are engaged with the three cam follower 2a and formed on the inner circumferential surface in a circumferential direction. The cam tube 3 further includes three third cam (groove) parts 3c that are engaged with three cam followers 5a and formed on the inner circumferential surface of the cam tube 3 in a circumferential direction.

A linearly moving guide tube 4 is arranged on an inner circumferential side of the cam tube 3. The cam tube 3 can rotate around the optical axis along the outer circumferential surface of the linearly moving guide tube 4. On the other hand, a guide plate (or a guiding member) 6 attached to a fixed tube 9 that is fixed to a chassis (not shown) of the camera 12 prevents the linearly moving guide tube 4 from rotating around the optical axis. The guide plate 6 is engaged with the fixed tube 9 such as to be movable in the optical axis direction while being prevented from rotating around the optical axis.

On the inner circumferential surface of the first lens unit 1, guide groove parts 1a extending in the optical axis direction are formed at three circumferential locations. Three guide protrusions 4a formed on the outer circumferential surface at a front end in the optical axis direction (object-side end part) of the linearly moving guide tube 4 are respectively engaged with the three guide groove parts 1a.

Guide protrusions 2b extending in the optical axis direction are formed at three locations on the outer circumferential surface of the second lens unit 2. The three guide protrusions 2b are engaged with guide groove parts 4b formed at three circumferential locations so that the three guide protrusions 2b can extend in the optical axis direction of the linearly moving guide tube 4.

Guide protrusions 5b extending in the optical axis direction are formed at three locations on the outer circumferential surface of the third lens unit 5. The three guide protrusions 5b are engaged with guide groove parts 4c formed at three circumferential locations so that the three guide protrusions 5b can extend in the optical axis direction of the linearly moving guide tube 4.

The cam tube 3 and the linearly moving guide tube 4 are rotatable relative to each other by a bayonet structure, and coupled to each other so as to be integrally movable in the optical axis direction. Since the linearly moving guide tube 4 is prevented from rotating as mentioned above, in practice, the cam tube 3 rotates relative to the linearly moving guide tube 4, and moves in the optical axis direction integrally with the linearly moving guide tube 4.

A moving cam tube (second cam tube) 8 is arranged on an inner circumferential side of the fixed tube 9. A cam follower 8b is formed on the outer circumferential surface at the rear part in the optical axis direction of the moving cam tube 8. The cam follower 8b is engaged with a cam (groove) part 9a formed on the inner circumferential surface of the fixed tube 9. A rotation transmitting protrusion 8a is formed on the outer circumferential surface at a rear end of the moving cam tube 8. The rotation transmitting protrusion 8a engages with a drive ring 10, which is arranged on the outer circumferential side of the fixed tube 9 and rotatable around the optical axis relative to the fixed tube 9. Therefore, the moving cam tube 8 rotates as the drive ring 10 rotates.

The moving cam tube 8 and the guide plate 6 are also rotatable relative to each other by a bayonet structure and coupled to each other so as to be integrally movable in the optical axis direction. Since the guide plate 6 is prevented from rotating as mentioned above, in practice, the moving cam tube 8 rotates relative to the guide plate 6 and the fixed tube 9, and moves in the optical axis direction relative to the fixed tube 9 integrally with the guide plate 6.

A cylindrical member 7 as an external member is arranged on the outer circumferential side of the cam tube 3 and the first lens unit 1. The cylindrical member 7 forms an external surface of the lens barrel 100 together with the moving cam tube 8, and closes a gap between the first lens unit 1 and the cam tube 3 to prevent penetrations of dirt and dust from outside into the lens barrel 100.

The cylindrical member 7 and the cam tube 3 are rotatable relative to each other by a bayonet structure, and coupled to each other so as to be integrally movable in the optical axis direction.

A cam follower 7a is formed on the outer circumferential surface at a rear end of the cylindrical member 7. The cam follower 7a is engaged with a cam (groove) part 8c formed on the inner circumferential surface of the moving cam tube 8.

The cylindrical member 7 is guided in the optical axis direction (prevented from rotating around the optical axis) by a guide protrusion (guide part) 1c formed on the outer circumferential surface of the first lens unit 1. For example, guiding the cylindrical member 7 in the optical axis direction by the guide plate 6 requires an engagement between the cylindrical member 7 and guide plate 6 such that the cylindrical member 7 can move relative to the guide plate 6 in the optical axis direction. As a result, this engagement occupies the space in the lens barrel 100, which makes the lens barrel 100 larger. In contrast, guiding the cylindrical member 7 by the guide protrusion 1c formed on the outer circumferential surface of the first lens unit 1 obviates the engagement space in the lens barrel 100 and improves the space efficiency. As a result, the lens barrel 100 can be made smaller.

When the moving cam tube 8 rotates as the cylindrical member 7 is guided in a linear movement manner in the optical axis direction, the cylindrical member 7 is moved in the optical axis direction together with the cam tube 3 and the linearly moving guide tube 4 due to the cam effect between the cam part 8c and the cam follower 7a. At this time, the cam tube 3 moves in the optical axis direction while rotating around the optical axis, since a protrusion part 3d of the cam tube 3 is engaged with the inner circumferential surface of the moving cam tube 8 and configured to rotate integrally with the moving cam tube 8.

11 denotes a cover tube, which covers the outer circumferential surface of the drive ring 10. The cover tube 11 is held by the fixed tube 9.

When the zoom motor drive circuit 29 shown in FIG. 9 rotates a zoom motor M connected thereto, the rotation is transmitted to the drive ring 10 via a power transmission mechanism (not shown) so as to rotate the drive ring 10 around the optical axis. When the drive ring 10 rotates, the moving cam tube 8 rotates around the optical axis, and moves in the optical axis direction relative to the fixed tube 9 and the drive ring 10 due to the cam effect between the cam follower 8b and the cam part 9a of the fixed tube 9. The guide plate 6 also moves together with the moving cam tube 8 in the optical axis direction relative to the fixed tube 9.

When the moving cam tube 8 moves in the optical axis direction as it rotates, the cylindrical member 7 moves in the optical axis direction relative to the moving cam tube 8 as described above, which causes the cam tube 3 also to move in the optical axis direction together with the cylindrical member 7, while rotating integrally with the moving cam tube 8. The linearly moving guide tube 4 moves in the optical axis direction together with the cam tube 3 and cylindrical member 7 without rotating.

The rotation of the cam tube 3 gives a drive force respectively to the first and second lens units 1 and 2 in the optical axis direction and in a direction around the optical axis due to the cam effect between the first and second cam parts 3a and 3b and the cam followers 1b and 2a. The third lens unit 5 also receives a drive force in the optical axis direction and in a direction around the optical axis due to the cam effect between the third cam parts 3c and the cam followers 5a. At this time, the first, second, and third lens units 1, 2, and 5 are prevented from rotating around the optical axis by the guide groove parts 1a, the guide protrusions 2b, and the guide protrusions 5b respectively making engagement with the guide protrusions 4a and the guide groove parts 4b and 4c of the linearly moving guide tube 4. Therefore, the first, second, and third lens units 1, 2, and 5 move only in the optical axis direction.

According to this embodiment, the first, second, and third lens units 1, 2, and 5 are guided in the optical axis direction by a single linearly moving guide tube 4 (in other words, they are prevented from rotating around the optical axis). Therefore, as compared to the case in which the first, second, and third lens units 1, 2, and 5 are guided in the optical axis direction by separate members as conventionally, relative decentering between these lens units 1, 2, and 5 is reduced. This accordingly improves the optical performance of the imaging optical system formed by the first, second, and third lens units 1, 2, and 5 and enables a high-quality image to be obtained by the camera 12.

Moreover, according to this embodiment, since the cam tube 3 and the linearly moving guide tube 4 are stretched out in the optical axis direction relative to the fixed tube 9, a lens barrel with a large entire length, i.e., high variable magnification ratio, can be realized.

The embodiment described above is merely a typical example and various changes and modifications can be made when working out the present invention.

For example, while one example has been described in the embodiment above in which both of the first and second lens units 1 and 2 are guided to move linearly by a single linearly moving guide tube 4, a member for linearly guiding the first lens unit 1 may be provided separately from the linearly moving guide tube 4.

This application claims the benefit of Japanese Patent Application No. 2007-261089, filed on Oct. 4, 2007, which is hereby incorporated by reference herein in its entirety.

FIELD OF INDUSTRIAL APPLICATION

The present invention provides a lens apparatus that can implement multistage-stretch-type zooming and linearly guide a plurality of members which move in the optical axis direction while having a compact structure, and an imaging apparatus that incorporates this lens apparatus.

The invention claimed is:

1. A lens apparatus, comprising:
a first lens unit and a second lens unit that can respectively move in an optical axis direction;
a first cam tube including a first cam part and a second cam part respectively formed on an outer circumferential surface and an inner circumferential surface thereof, the first cam tube moving the first and second lens units respectively in the optical axis direction using the first and second cam parts while rotating around an optical axis;
a linearly moving guide tube that is arranged on an inner circumferential side of the first cam tube and configured to guide the second lens unit in the optical axis direction;
a guide member that is configured to guide the linearly moving guide tube in the optical axis direction;
a cylindrical member that is provided on an outer circumferential side of the first lens unit; and
a second cam tube that is configured to move the first cam tube in the optical axis direction together with the linearly moving guide tube and the cylindrical member while rotating around the optical axis,
wherein the first lens unit includes a guide part configured to guide the cylindrical member in the optical axis direction.

2. A lens apparatus according to claim 1, wherein the first lens unit is guided in the optical axis direction by the linearly moving guide tube.

3. An imaging apparatus including a lens apparatus according to claim 1.

* * * * *